(12) United States Patent
Beck et al.

(10) Patent No.: US 7,793,773 B2
(45) Date of Patent: Sep. 14, 2010

(54) CHARACTERISATION SYSTEM FOR OBJECTS AND METHOD FOR FEEDING OBJECTS TO A CHARACTERISATION DEVICE

(75) Inventors: Bruno Beck, Bisingen (DE); Dieter Conzelmann, Albstadt (DE); Armin Gaiser, Benzingen (DE); Gerd Kammerer, Zimmern o. R. (DE); Martin Kraft, Dautmergen (DE)

(73) Assignee: Bizerba GmbH & Co. KG, Balingen (DE)

( * ) Notice: Subject to any disclaimer, the term of this patent is extended or adjusted under 35 U.S.C. 154(b) by 747 days.

(21) Appl. No.: 11/769,841

(22) Filed: Jun. 28, 2007

(65) Prior Publication Data

US 2008/0011583 A1 Jan. 17, 2008

(30) Foreign Application Priority Data

Jun. 30, 2006 (DE) .................. 10 2006 031 577

(51) Int. Cl.
*B65G 21/06* (2006.01)
(52) U.S. Cl. .................. 198/584; 198/817; 198/571
(58) Field of Classification Search .................. 198/817, 198/861.5, 584, 586, 589, 592, 443, 606, 198/610, 626.1, 626.3; 177/1, 5, 119, 145
See application file for complete search history.

(56) References Cited

U.S. PATENT DOCUMENTS

| | | | | |
|---|---|---|---|---|
| 2,075,752 A | * | 3/1937 | Rowe | 198/610 |
| 2,315,246 A | * | 3/1943 | Cunning | 198/610 |
| 2,813,617 A | * | 11/1957 | Sheetz | 198/454 |
| 2,966,250 A | * | 12/1960 | Robock | 198/443 |
| 3,628,651 A | * | 12/1971 | Wolzak | 198/817 |
| 4,557,341 A | * | 12/1985 | Söderholm | 177/16 |
| 4,578,841 A | * | 4/1986 | Nijhuis | 452/53 |
| 2005/0205192 A1 | | 9/2005 | Geisel | |

FOREIGN PATENT DOCUMENTS

| | | |
|---|---|---|
| DE | 344205 | 11/1921 |
| DE | 967 520 | 11/1957 |
| DE | 2 252 451 | 5/1974 |
| DE | 196 09 431 | 9/1997 |
| DE | 196 19 584 | 11/1997 |
| EP | 0 858 961 | 11/2002 |
| FR | 2 725 704 | 4/1996 |
| JP | 8-198422 | 8/1996 |

(Continued)

*Primary Examiner*—James R Bidwell
(74) *Attorney, Agent, or Firm*—Leydig, Voit & Mayer, Ltd.

(57) ABSTRACT

A characterisation system for objects is provided, comprising at least one characterisation device for the objects, a conveyor belt assembly for feeding objects to the at least one characterisation device, which comprises at least one region with a first conveyor belt section and with a second conveyor belt section, wherein the first conveyor belt section and the second conveyor belt section lie parallel and adjacent to one another and can be positioned at an angle of inclination to a horizontal plane to provide a trough-shaped conveyor path with the first conveyor belt section and the second conveyor belt section in a V disposition, and a drive device for the first conveyor belt section and the second conveyor belt section for the adjustment of defined angle positions.

40 Claims, 4 Drawing Sheets

FOREIGN PATENT DOCUMENTS

| | | |
|---|---|---|
| JP | 8-301435 | 11/1996 |
| JP | 8-301436 | 11/1996 |
| JP | 10-279034 | 10/1998 |
| JP | 11-100109 | 4/1999 |
| JP | 11-124211 | 5/1999 |
| JP | 2003-285910 | 10/2003 |
| WO | WO 2004/043786 | 5/2004 |

\* cited by examiner

CHARACTERISATION SYSTEM FOR OBJECTS AND METHOD FOR FEEDING OBJECTS TO A CHARACTERISATION DEVICE

The present disclosure relates to the subject matter disclosed in German application number 10 2006 031 577.4 of Jun. 30, 2006, which is incorporated herein by reference in its entirety and for all purposes.

BACKGROUND OF THE INVENTION

The invention relates to a characterisation system for objects comprising at least one characterisation device for the objects and a conveyor belt assembly for feeding objects to the at least one characterisation device.

The invention additionally relates to a method for feeding objects to a characterisation device by means of a conveyor belt assembly.

The at least one characterisation device characterises the objects by determining one or more properties of an object and/or providing an object with an identification, i.e. in particular by positioning one or more properties of an object to be readable on the object.

In a labelling system objects are characterised by labels with object data being affixed to the objects. Such a labelling system can also comprise a weighing device as additional characterisation device, by means of which the weight of an individual object can be determined. The weight of the object, and possibly the price of the object if the price per unit weight is known, can then be printed on a label.

SUMMARY OF THE INVENTION

In accordance with the present invention, a characterisation system is provided, which can be operated simply.

In accordance with an embodiment of the invention, a conveyor belt assembly is provided for feeding objects to the at least one characterisation device, which comprises at least one region with a first conveyor belt section and with a second conveyor belt section, wherein the first conveyor belt section and the second conveyor belt section lie parallel and adjacent to one another and can be positioned at an angle of inclination to a horizontal plane to provide a trough-shaped conveyor path with the first conveyor belt section and the second conveyor belt section in a V disposition, and a drive device for the first conveyor belt section and the second conveyor belt section is provided for the adjustment of defined angle positions.

As a result of the adjustment of a defined angle position of the first conveyor belt section and the second conveyor belt section, a trough-shaped conveyor path is provided, wherein the conveyor belt sections are arranged in a V shape. A defined "centring" of objects to be identified can be achieved as a result of this. This additionally ensures that the objects to be identified are fed in a defined path to the at least one characterisation device. This ensures that the characterisation device can access the objects to be identified. For example, this ensures that a label can be applied at the correct location of the object.

High characterisation rates and, for example, high labelling rates can be reached as a result of the "centring" by means of the V arrangement of the conveyor belt sections. As a result, weight data for example, can also be determined simply and quickly for the objects to be identified.

The angle of inclination is dependent on the product size: a smaller angle of inclination is necessary for larger products and a larger angle of inclination (in relation to the horizontal plane) is necessary for smaller products to obtain an optimised centring of the product.

By means of the drive device the angle of inclination can be adjusted, in particular automatically adapted, to the respective objects (and in particular category of objects). As a result, the characterisation system is adaptable to different object categories in a simple manner. The adjustment (which generally does not occur during the operation of the characterisation system, but prior to operation) can be performed simply and quickly with minimum intervention effort. As a result, the outage times can also be minimised if a new adjustment is necessary for another category of objects.

The corresponding product data, on which the adjustment is based, may have been determined previously by means of a sensor assembly or may already have been stored in a product data bank. This allows a simple actuation capability for adjustment of the required angle of inclination of the first conveyor belt section and the second conveyor belt section.

In particular, it is favourable if a control device is present, by means of which the drive device can be controlled as a function of product data of the objects for the defined adjustment of the angle position. As a result, it can be assured that the corresponding objects (which belong to a specific category) are correctly "centred" to be able to feed them in an optimum manner to the at least one characterisation device.

Expediently, the product data, on the basis of which the angle positions are adjusted, are geometric data. These geometric data then determine the angle of inclination of the first conveyor belt section and the second conveyor belt section to obtain an optimised characterisation by means of the at least one characterisation device.

A sensor assembly (sensor device) for determination of the product data, on the basis of which the angle positions are adjusted, can be present. The sensor assembly then determines the necessary product data prior to the actual operation of the characterisation system. The sensor assembly can comprise a barcode scanner, for example, by means of which barcodes on the objects can be read. The sensor assembly can also comprise a camera and an evaluation device, by means of which the size and shape of objects, for example, can be detected in particular according to category.

It is most particularly advantageous if a product data bank (data base) for product data, on the basis of which the angle positions are adjusted, is present. The necessary data are stored in this product data bank. The correct adjustment can then occur simply and quickly by corresponding readout of these product data.

It is most particularly advantageous if the drive device is configured and controlled such that defined angle positions are automatically adjustable. For example, an operator specifies the product category. The control device then reads the corresponding product data from a product data bank, on the basis of which data the defined angle position on the conveyor belt assembly is then adjusted. As a result, a trough-shaped conveyor path is provided, which is optimised for the corresponding product category.

In one embodiment, the drive device has at least one actuating cylinder for each conveyor belt section. The corresponding angle position can be adjusted simply by means of an actuating cylinder. A plurality of actuating cylinders can be provided, depending on the length of the conveyor belt section.

In one embodiment, the at least one actuating cylinder is operated electromotively. For example, an electrical cylinder is provided. Such an actuating cylinder can be controlled simply. In principle, any desired angle positions can be adjusted at least within a range.

It can also be provided that the at least one actuating cylinder is operated pneumatically or hydraulically. If, for example, the characterisation system already comprises a pneumatic unit (for example, as part of a labelling device), then a pneumatic angle adjustment can be performed in a simple manner.

It is favourable if the at least one actuating cylinder is articulated to the corresponding conveyor belt section and to a frame. As a result of this, an angle adjustment can be simply performed. If the actuating cylinder has a movable spindle, then the angle can be adjusted in a defined manner by the stroke of the spindle.

In one embodiment, an adjustment of a defined angle position of a conveyor belt section is performed starting from a reference position. This enables the system to be calibrated in a simple manner. In particular, the reference position is entered prior to the adjustment. This enables the monitoring expenditure to be kept relatively low.

In particular, the reference position is a horizontal position, wherein the first conveyor belt section and the second conveyor belt section are oriented parallel to the horizontal plane.

In one embodiment, the control device controls the drive device for adjustment of an angle position by incrementing pulses starting from a reference position. This enables a defined angle adjustment to be performed in a simple manner. This is a relative adjustment, for which no absolute position determination is necessary.

In an alternative embodiment, the control device controls the adjustment of a defined angle position absolutely. For this, an angle is predefined, wherein the angle position is entered absolutely. An absolute position sensor is necessary for this.

In particular, a synchronous actuation of different drive sub-units of the drive device is provided. For this, a synchronous actuation of drive sub-units in particular is provided, which are associated with the first conveyor belt section and the second conveyor belt section. If the characterisation system comprises different regions, which have to be adjusted separately with respect to their angle position, then a synchronous actuation of all drive sub-units is also advantageously provided.

It is most particularly advantageous if the first conveyor belt section and the second conveyor belt section are supported against one another and/or are supported on a frame. This enables a rigid conveyor belt assembly to be formed even in an angled.

In one embodiment, the drive device is configured such that angle positions are infinitely adjustable. As a result of this, a high variation range is obtained with respect to the adjustment of the trough-shaped conveyor path.

In an alternative embodiment, the drive device is configured such that discrete angle positions are adjustable. Pneumatic actuating cylinders, for example, are provided for this. The corresponding characterisation system can be configured in a simple manner.

It is favourable if a conveyor belt of the first/second conveyor belt section is driven by a drive, which is positioned on the first conveyor belt section/second conveyor belt section. The expenditure necessary for torque transmission from the drive to the conveyor belt is kept low as a result of this.

In one embodiment, a weighing device is provided as characterisation device. The objects are directed through the weighing device, wherein weight data are determined.

In the case of a labelling system, a labelling device is provided as characterisation device. In this case, a weighing device can be connected upstream. The labelling device applies a label with printed product data on the corresponding objects.

It is favourable if the labelling device is movable relative to the conveyor belt assembly. This enables the labelling device to be positioned relative to the conveyor belt assembly during the preparation of labelling processes in such a way that an optimised labelling result is achieved, and in particular a high labelling rate is achieved, i.e. a high product throughput is achieved. The position of the labelling device in this case is dependent in particular on the angle position of the first conveyor belt section and the second conveyor belt section.

For example, the labelling device has a labelling head, which is displaceable in at least one direction transversely to a transport direction of the conveyor belt assembly. As a result, this can be positioned in an optimised position on the conveyor belt assembly to obtain an optimised labelling result.

It can also be provided that the labelling device has a labelling head, which can pivot around at least one pivot axis. This enables the orientations in which a label can be applied to an object to be adjusted. The pivotal range amounts to 90°, 180° or 270°, for example. The pivotal movement is driven, for example, by pneumatic or electromotive means. The pivoting ability allows decorative labels with a pre-printed logo (such as a company logo), for example, to be applied specifically at a desired position such as a front side of an object. The pivoting ability can also be achieved without the conveyor belt sections being angle adjustable.

In particular, the at least one pivot axis is oriented transversely to a transport direction of the conveyor belt assembly to enable the orientation of applied labels to be adjusted.

In this case, the at least one pivot axis is expediently a vertical axis, i.e. an axis that is oriented at least approximately parallel to the direction of gravity.

It can be provided that the conveyor belt assembly has a plurality of regions, which respectively have a first conveyor belt section and a second conveyor belt section. Different regions have different functions. For example, a weighing region can be provided and a subsequent labelling region, wherein weight data determined in the weighing region are used when printing labels to be applied.

In one exemplary embodiment, the conveyor belt assembly has a feed region. Objects are fed in via the feed region.

In a further exemplary embodiment, the conveyor belt assembly has a separation region. The separation region serves to separate objects, so that these are fed individually to a weighing region and/or a labelling region.

The conveyor belt assembly has a weighing region in particular in association with a labelling system. In this weighing region, weight data of individual objects are determined, wherein these weight data are then used for the labelling. For example, working from a price per unit weight a total price is determined for a previously weighed object.

In particular, the conveyor belt assembly has a labelling region, at which labels are applied.

It is favourable if the angle positions of the first conveyor belt sections and the second conveyor belt sections can be synchronised in the different regions by a control device. This enables an adjustment, in particular an automatic adjustment, of the same angle of inclination to be achieved in all regions.

It is favourable if at least one safety wall is associated with the conveyor belt assembly. As a result of this, accessibility of the conveyor belt assembly can be blocked in particular during the adjustment of the angle of inclination.

It is most particularly advantageous if at least one position sensor is respectively associated with the first conveyor belt section and the second conveyor belt section. If actuating cylinders are provided, then each actuating cylinder in particular is provided with its own position sensor. The adjustment of the first conveyor belt section and the second conveyor belt section can then be monitored in the respective angle of inclination and the presence of any errors can be recognised earlier.

In addition, in accordance with the present invention, a method is provided, by means of which a simple and quick characterisation of the objects can be achieved.

In accordance with an embodiment of the invention, an angle adjustment of a first conveyor belt section and a second conveyor belt section of the conveyor belt assembly relative to a horizontal plane is automatically performed by means of a drive device as a function of product data of the objects.

The method according to the invention has the advantages already explained in association with the characterisation system according to the invention.

Further advantageous embodiments of the method according to the invention have likewise already been explained in association with the characterisation system according to the invention.

In particular, the product data are geometric data. This allows an optimised adjustment of the conveyor belt assembly to be achieved as a function of the geometry of the objects.

In particular, the angle to the horizontal plane is adjusted to be larger if the objects have smaller geometric dimensions. This allows the smaller objects to be centred in an optimised manner to enable them to be fed in a defined position to the characterisation device.

In particular, the product data are taken from a product data bank and/or are determined by a sensor assembly to achieve an automatic angle adjustment in a simple manner.

It is favourable if the adjustment of a defined angle position is performed starting from a reference position. This allows an angle adjustment to be performed with minimised control expenditure. The reference position is firstly approached prior to adjustment of the defined angle position.

In particular, the reference position is a horizontal position. This can be defined in a simple manner. For example, a cylinder housing has a corresponding abutment region, by means of which the reference position is defined as a horizontal position.

The following description of preferred embodiments serves to explain the invention in more detail in association with the drawings.

DETAILED DESCRIPTION OF THE INVENTION

Figure 1:
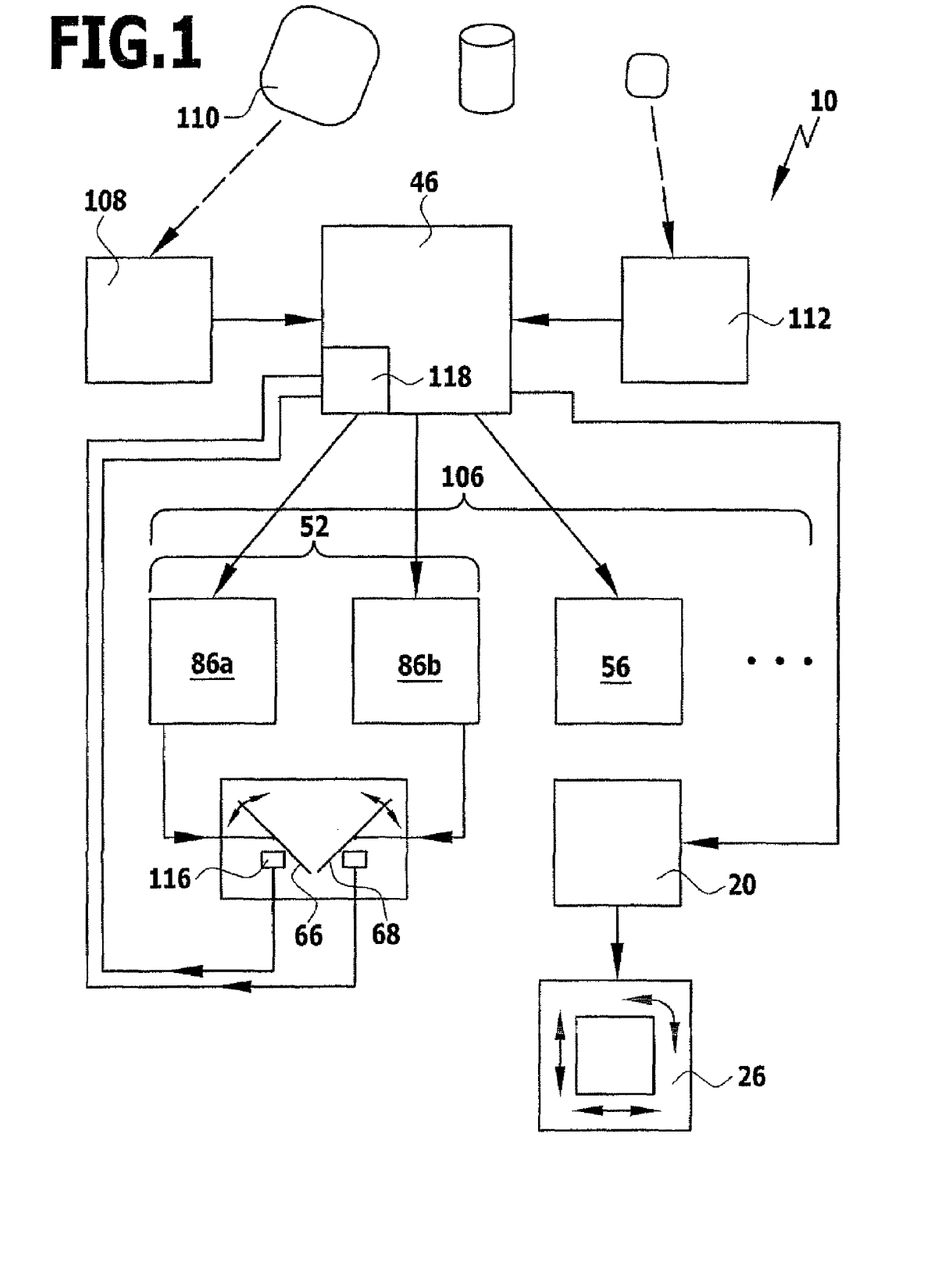
FIG. 1 is a schematic block diagram of an exemplary embodiment of a characterisation system according to the invention.
Figure 2:
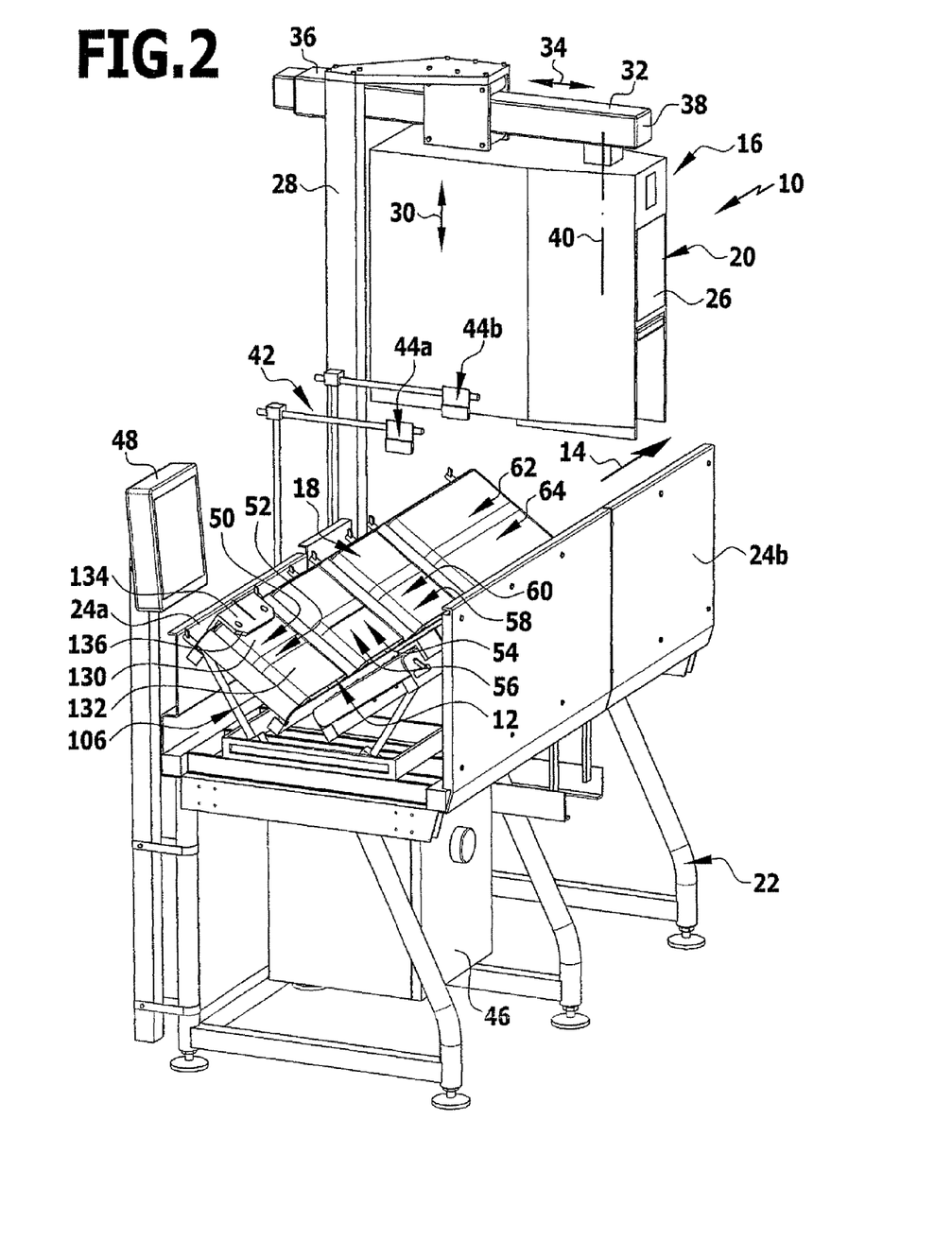
FIG. 2 is a perspective representation of an exemplary embodiment of a characterisation system according to the invention.

An exemplary embodiment of a characterisation system according to the invention, which is shown schematically in a block diagram in FIG. 1 and is given the reference 10 there and is shown in perspective in FIG. 2, comprises a conveyor belt assembly 12, by means of which objects can be fed in a transport direction 14 to one or more characterisation device 16 for the objects.

In the shown exemplary embodiment, a weighing device 18 is provided as characterisation device. In addition, a labelling device 20 is provided as characterisation device.

The characterisation system 10 comprises a frame 22, on which the conveyor belt assembly 12 is arranged. The conveyor belt assembly 12 is supported on the frame 22.

The conveyor belt assembly 12 is positioned between opposing safety walls 24a, 24b in this case. The safety walls 24a, 24b are arranged, in particular in a fixable manner, to pivot on the frame 22. They can be pivoted down for cleaning of the conveyor belt assembly 12, for example. In the representation shown in FIG. 2, they are oriented substantially vertically.

The labelling device 20 comprises a labelling head 26. This is arranged on a column 28, for example, which is fixedly connected to the frame 22. The column 28 projects beyond the conveyor belt assembly 12 in particular in vertical direction.

The labelling head 26 is mounted in a fixable manner to be displaceable on the column 28. The displacement movement is permitted in a direction/contrary direction 30, which is oriented transversely and in particular perpendicularly to the transport direction 14. In particular, the direction 30 is a vertical direction.

A cross guide 32 is arranged at or in the vicinity of an upper end of the column 28. The labelling head 26 is positioned in a fixable manner to be displaceable in one direction/contrary direction 34 on this cross guide, wherein the direction 34 is transverse and in particular perpendicular to the transport direction 14. A drive 36, which is an electric motor in particular, is provided to actuate the displacement movement.

Because of its mobility in direction 30, the labelling head 26 can be adjustably positioned in height above the conveyor belt assembly 12 and can be positioned in a fixable manner in its transverse position above the conveyor belt assembly 12 by means of the cross guide 32 in direction 34.

It is provided in one embodiment that the labelling head is mounted on a pivot bearing 38 to pivot around a pivot axis 40 on the cross guide 32. This mobility of the labelling head 26 allows the orientation in which a label can be applied to an object to be adjusted. For example, a label can be applied in a first orientation or in a second orientation, which lies at an angle of 90° to the first orientation. It can also be provided that the maximum pivotal angle range lies at 180° or 270°.

The labelling device 20 comprises, for example, a rotating label applicator or a blow label applicator. It can also comprise a stamping label applicator such as described in WO 2004/043786 A1 or US 2005-0205192 A1, for example.

A light barrier assembly 42, which comprises, for example, two spaced light barriers 44a, 44b (with corresponding sensor and reflector), is arranged on the frame 22 spaced from the conveyor belt assembly 12. The light barrier 44a serves, for example, to monitor whether any objects are being delivered at all. The light barrier 44b serves, for example, to monitor whether objects are positioned on a weighing device, which will be explained in further detail below.

The characterisation system comprises a control device 46, by means of which the characterisation system 10 can be controlled. The control device 46 has an associated terminal 48, at which the system status can be read. Terminal 48 or a separate terminal also serves to provide the control device 46 with parameters.

The objects must be fed to the (at least one) characterisation device 16 in a specific position, so that the objects can be identified at a high flow rate. They must be passed through "centred" to some extent. As a result, labels can be applied to the objects at a high rate, for example, wherein a movement of the labelling head 26 is not necessary while applying labels.

The centring for defined positioning for the at least one characterisation device 16 is dependent on the size of an object.

It is provided that the conveyor belt assembly 12 has a plurality of regions, which include separate conveyor belt units. In the shown exemplary embodiment, a feed region 50 with a conveyor belt unit 52 is provided. This feed region 50 is followed by a separation region 54 with a conveyor belt unit 56. The separation region 54 serves to separate objects.

The separation region 54 is followed in the transport direction 14 by a weighing region 58 with a conveyor belt unit 60. The weighing region 58 is followed in the transport direction 14 by a labelling region 62 with a conveyor belt unit 64.

The conveyor belt units 52, 56, 60, 64 are fundamentally independent of one another, wherein a synchronised angle positioning is possible by means of the control device 46, as will be explained below. Objects are transferred from conveyor belt unit 52 to conveyor belt unit 56, transferred from conveyor belt unit 56 to conveyor belt unit 60 and transferred from this to conveyor belt unit 64. The labelling of the objects occurs on conveyor belt unit 64.

Figure 3:
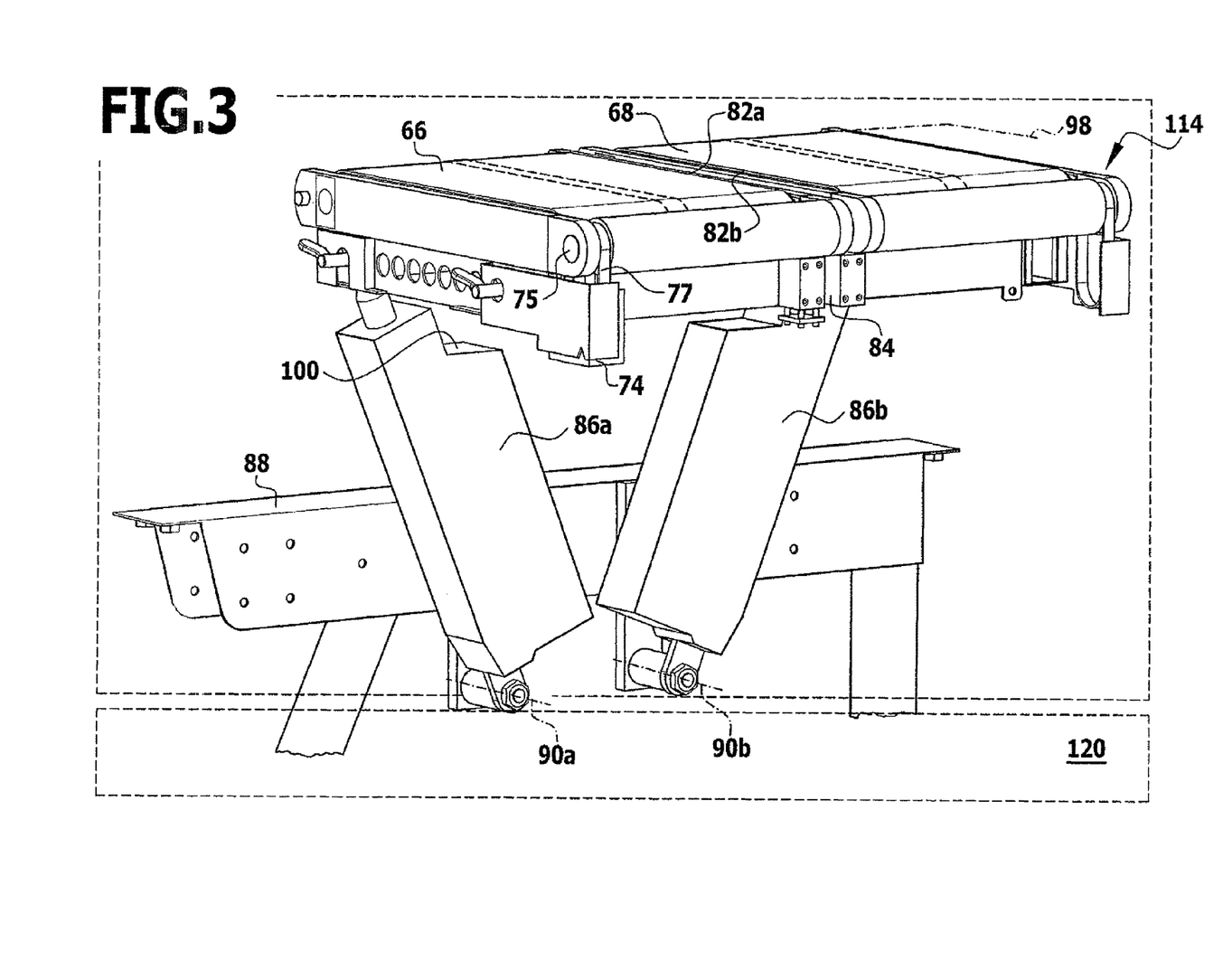
FIG. 3 is a sectional view of a conveyor belt assembly of the characterisation system according to FIG. 2 with horizontal position of a first conveyor belt section and a second conveyor belt section.
Figure 4:
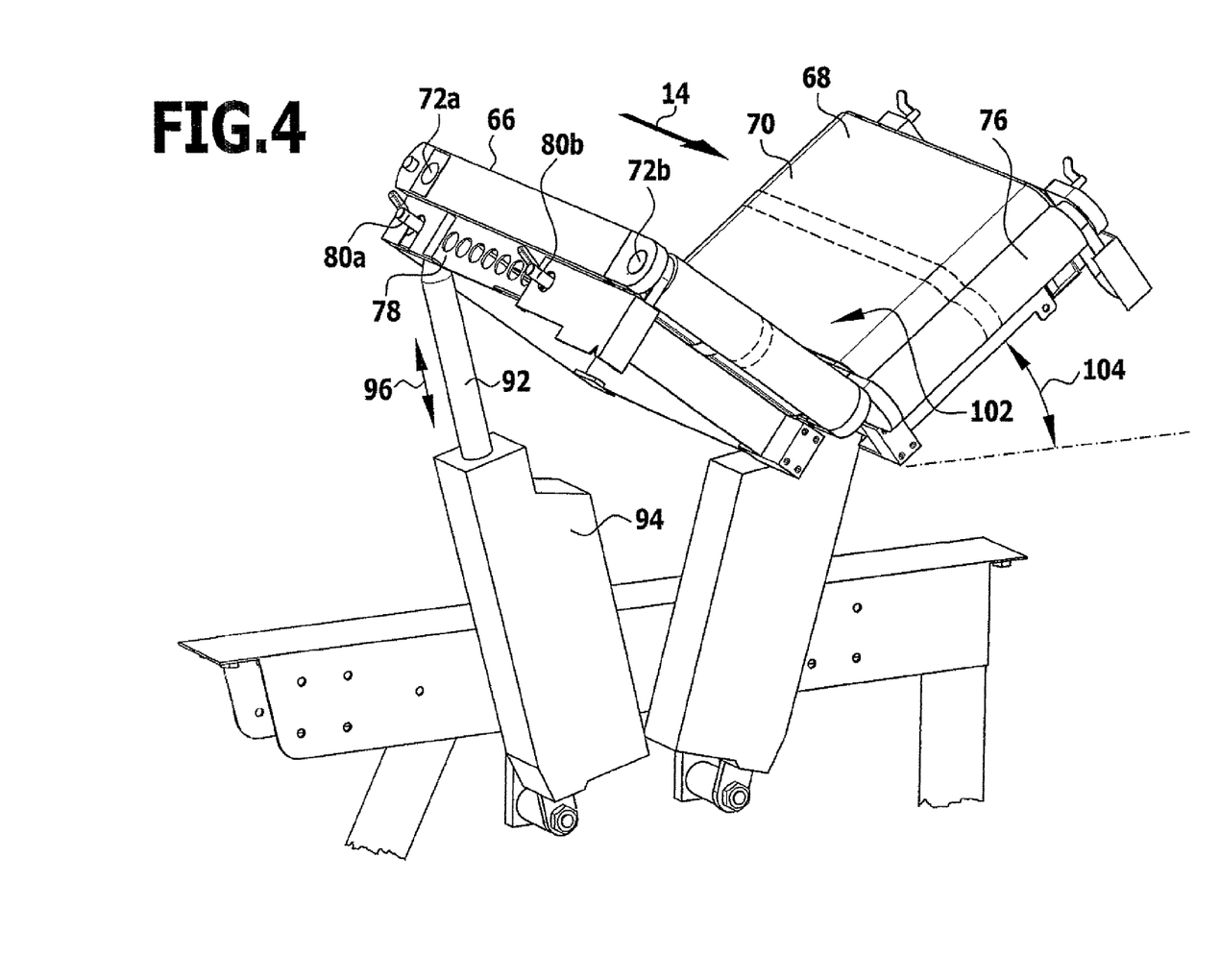
FIG. 4 is the same view as FIG. 3 with an angle position of the first conveyor belt section and the second conveyor belt section relative to a horizontal plane.

The respective conveyor belt units 52, 56, 60, 64 respectively comprise a first conveyor belt section 66 and a second conveyor belt unit 68 (FIGS. 3 and 4). The first conveyor belt section 66 and the second conveyor belt section 68 lie oriented parallel and adjacent to one another. They follow one another in a transverse direction to the transport direction 14 and are respectively oriented parallel to the transport direction 14. The first conveyor belt section 66 and the second conveyor belt section 68 respectively have a conveyor belt 70, which is endlessly guided on rollers 72a, 72b. (Further rollers can also be provided). One of rollers 72a, 72b is driven. It is provided with a corresponding drive 74 for this (FIG. 3). The drive 74 is configured in particular as an electric motor. In this case, the drive 74 preferably sits on the front side on the respective conveyor belt section 66 or 68 and drives a driving roller 75 by means of a belt 77.

Towards at least one end, the first conveyor belt section 66 and the second conveyor belt section 68 respectively have a rotatably mounted roller 76, which serves to connect to an adjacent conveyor belt unit and which serves to bypass the spacing to this adjacent conveyor belt unit.

The rollers 72a, 72b are held on a supporting frame 78. The respective conveyor belt 70 is secured to the rollers 72a, 72b by means of a claw coupling (not shown in FIGS. 3 and 4). The claw coupling can be released by means of corresponding pivot levers 80a, 80b. This allows a quick belt change to be performed.

The first conveyor belt section 66 has a side 82a, which faces the second conveyor belt section 68. Accordingly, the second conveyor belt section 68 has a side 82b, which faces the first conveyor belt section 66. The two sides 82a and 82b are oriented parallel to the transport direction 14.

The first conveyor belt section 66 and the second conveyor belt section 68 are supported on one another by means of a hinge arrangement 84. The hinge arrangement 84 is arranged on the respective supporting frame 78 of the first conveyor belt section 66 and the second conveyor belt section 68.

The first conveyor belt section 66 is supported on the frame 22 by means of (at least) one actuating cylinder 86a. The second conveyor belt section 68 is supported accordingly by means of (at least) one actuating cylinder 86b. The number of actuating cylinders per conveyor belt section is dependent on the length of the corresponding conveyor belt section in the transport direction 14. A single actuating cylinder 86a per conveyor section is sufficient in the case of shorter conveyor belt sections. A plurality of actuating cylinders are provided in the case of longer conveyor belt sections.

The actuating cylinders 86a, 86b are articulated to a cross beam 88 of the frame 22 to pivot around a respective pivot axis 90a, 90b. The pivot axes 90a, 90b are oriented parallel to one another and parallel to the transport direction 14.

The first actuating cylinder 86a is likewise articulated to pivot on the supporting frame 78 of the first conveyor belt section 66 with a pivot axis parallel to the pivot axis 90a. Accordingly, the actuating cylinder 86b is articulated to pivot on the supporting frame 78 of the second conveyor belt section 68. In this case, the articulation is respectively achieved by means of a spindle 92, which is displaceable in one direction 96 relative to a cylinder housing 94. The articulation on the cross beam is achieved by means of the cylinder housing 94.

The respective angle position of the first conveyor belt section 66 and the second conveyor belt section 68 is adjustable relative to a horizontal plane 98 (FIG. 2) as a result of the extension or retraction of the spindle 92 on the cylinder housing 94. In an initial position, which is defined by a surface of the conveyor belt 70 of the first conveyor belt section 66 and the second conveyor belt section 68 lying in a horizontal plane (FIG. 3), the first conveyor belt section 66 and the second conveyor belt section 68 are oriented in alignment in one plane relative to their conveyor belt 70. The spindle 92 is retracted into the cylinder housing 94 so far that the corresponding supporting frame 78 lies on an abutment region 100 of the cylinder housing 94. This abutment region 100 is formed, for example, by a recess on a front side of the housing of the cylinder housing 94.

The inclination of the first conveyor belt section 66 and the second conveyor belt section 68 relative to the horizontal plane can be adjusted by extending the spindle 92. This results in a V-shaped or trough-shaped conveyor path 102 (FIG. 4). A defined transport position of an object on the conveyor belt assembly 12 can be obtained by adapted adjustment of the angle positions of the first conveyor belt section 66 and the second conveyor belt section 68 relative to the horizontal plane 98. In this case, this defined positioning is fixed relative to a transverse direction to the transport direction 14. By adapting the corresponding angle of inclination 104 to the corresponding objects, objects of different size can be guided in "centred" arrangement and fed to the weighing device 18 and the labelling device 20 in a defined transverse position relative to the transport direction 14. This enables the delivered objects to be quickly identified and in particular labelled at a high labelling rate.

The whole assembly of the actuating cylinders that are coupled to the conveyor belt assembly 12 forms a drive device 106. This drive device 106 is coupled to the control device 46, wherein the control device 46 transmits corresponding control signals to the drive device 106 and in particular to the actuating cylinders of the drive device 106. The actuating cylinders 86a, 86b respectively form a drive sub-unit of the drive device 106. The actuating cylinders for each region (feed region 50, separation region 54, weighing region 58, labelling region 62) form respective drive sub-units of the drive device 106.

In this case, the individual actuating cylinders 86a, 86b can be operated by an electromotive device or pneumatically or hydraulically.

For example, an electromotive operation (in particular respectively by means of an electric motor arranged in the cylinder housing 94) is provided if a continuous adjustment of the angle of inclination 104 is to be facilitated.

In the case of a pneumatic operation, discrete angle positions are provided in particular; e.g. three different discrete angle positions are provided. Pneumatic actuating cylinders are advantageous, for example, when the characterisation system 10 already comprises a pneumatic system such as a pneumatically controlled blow label actuator, for example.

The control device 46 has an associated product data bank 108 for objects 110 to be identified. Geometric data of objects 110, on the basis of which the angle of inclination 104 is adjustable, i.e. the angle position of the respective first conveyor belt section 66 and the second conveyor belt section 68 is adjustable relative to the horizontal plane 98, are stored in the product data bank 108. The geometric data in turn identify a class of objects. It is not necessary for the geometric data of each individual object to be stored, but for a category of objects to be stored. (Usually, it is not provided that the angle of inclination 104 is adapted to individual objects; substantially only an adaptation to a specific category of objects is provided. Moreover, the angle of inclination 104 is not adjusted during operation of the characterisation system 10, but the angle position of the respective first conveyor belt section 66 and the second conveyor belt section 68 is fixedly adjusted during operation.) With a change of category, the necessary adjustments can be quickly achieved on the basis of the automatic actuation ability, so that the outage times can be minimised.

The product data bank 108 can also contain further data of the objects 110. For example, the price per unit weight is stored in the product data bank 108 for a specific category of objects. After weighing objects in the weighing region 58, labels can then be applied to the objects 110 that have the weight and the price associated with the weight printed on them. The labelling device 20 comprises a printer for this purpose.

Alternatively or additionally, it can be provided that the corresponding geometric data for the adjustment of the angle position of the first conveyor belt section 66 and the second conveyor belt section 68 are determined by means of a sensor assembly 112. This sensor assembly is then arranged such that an adjustment of the angle of inclination 104 is still possible after object detection. For example, object detection occurs at a specific time point for a class of objects 110, the corresponding angle of inclination 104 is then adjusted, and no further object detection with respect to geometric data occurs during operation and in particular during labelling operation of the characterisation system 10.

As shown schematically in FIG. 1, the control device 46 actuates the drive device 106 on the basis of the geometric data of the objects 110. In this case, the respective actuating cylinders 86a, 86b of the first conveyor belt section 66 or the second conveyor belt section 68 are controlled automatically.

Actuation occurs synchronously to allow a symmetric adjustment of the angle of inclination.

If further actuating cylinders are provided for the corresponding conveyor belt section, then these are likewise controlled.

If the conveyor belt assembly 12 comprises several regions with respective conveyor belt sections 66, 68 (such as the feed region 50, separation region 54, weighing region 58 and labelling region 62, for example), then the corresponding conveyor belt units 52, 56, 60 and 64 are likewise synchronously adjusted in order to obtain a uniform adjustment of the angle of inclination over the conveyor belt assembly 12 and thus obtain a trough-shaped conveyor path 102 over the entire conveyor belt assembly 12.

The adjustment of the angle position of the respective first conveyor belt section 66 and the second conveyor belt section 68 is achieved starting from a reference position 114 (FIG. 3), which is a horizontal position. In the reference position the conveyor belts 70 of the first conveyor belt section 66 and the second conveyor belt section 68 are oriented in alignment in a horizontal plane.

For adjustment of a defined angle of inclination 104, the respective first conveyor belt section and the second conveyor belt section 68 are firstly moved into the reference position 114.

Starting from there, a pulse incrementation is then carried out (wherein the control device 46 performs the corresponding actuation) until the angle of inclination to be reached is adjusted.

In this case, a position sensor 116 is provided for each conveyor belt section 66 or 68 and in particular for each actuating cylinder 86a, 86b. Such a position sensor 116 is, for example, a Reed contact sensor, which determines the corresponding actuating cylinder position.

In an embodiment it is provided that twelve counting pulses of the control device 46 correspond to an angle range of 1°.

The maximum angle of inclination 104 amounts to approximately 45°, for example.

The spindle 92, which can be extended linearly from the cylinder housing 94, has a total stroke of 130 mm, for example. This total stroke corresponds to 520 pulses, for example.

In this case, a monitoring device 118, which is integrated in particular into the control device 46, can be provided. If a plurality of actuating cylinders are associated with a single conveyor belt section, for example, this monitoring device 118 monitors if no excessive pulse deviation is present between different actuating cylinders. If too great a pulse deviation is detected, then the adjustment is halted.

The control device 46 is also coupled to the labelling device 20 to adapt the position of the labelling head 26 (linear position in direction 30 and in direction 34) to the inclination position of the respective first conveyor belt section 66 and the second conveyor belt section 68.

The conveyor belt unit 52 of the feed region 50 has a first conveyor belt section 130 and a second conveyor belt section 132. An alignment element 134 is respectively arranged on the first conveyor belt section 130 and the second conveyor belt section 132 (FIG. 2). The corresponding alignment element 134 serves to align trays that are directed through the characterisation system 10. If objects on trays are to be identified, then the conveyor belt sections of the conveyor belt assembly 12 are usually in the horizontal position, i.e. not in V disposition. The alignment elements 134 in the feed region 50 ensure that the trays are centred on the conveyor belt assembly 12 and in particular are fed centred to the weighing device 18 and the labelling device 20.

For this, the alignment elements 134 have a sloping section 136, which assures the alignment and defined positioning on the conveyor belt assembly 12.

The alignment elements 134 are configured in particular as slides, wherein the positions of the alignment elements 134 are adjustable in a position transverse and in particular perpendicular to the transport direction 14. This enables an adaptation to different tray sizes.

The adjustment of the alignment elements 134 can be achieved manually, or it can be achieved by motor, for example, if a corresponding drive is provided. In this case, control is possible by means of the control device 46. Tray sizes are included in the product data bank 108, for example.

The characterisation system 10 according to the invention functions as follows:

The angle of inclination 104 of the first conveyor belt section 66 and the second conveyor belt section 68 is adjusted in accordance with the product class of objects 110 that are to be identified. If the characterisation system 10 comprises a plurality of regions, the angle of inclination is adjusted identically in the different regions.

The necessary adjustment data are taken from the product data bank 108 or have been previously determined by the sensor assembly 112.

The adjustment of the defined angle position of the first conveyor belt section 66 and the second conveyor belt section 68 in particular occurs automatically. The control device 46 actuates the drive device 106 accordingly. The adjustment occurs starting from the reference position 114. If the first conveyor belt section and the second conveyor belt section are not located in the reference position 114, this is firstly accomplished.

The reference position 114 is also defined "by hardware" by the abutment region 100 of the actuating cylinders 86a, 86b.

The adjustment of the defined angle of inclination 104 is achieved by extending the spindle 92 from the respective cylinder housing 94. The corresponding control signals are supplied by the control device 46. This in particular supplies counting pulses, the number of which corresponds to the angle of inclination 104 to be adjusted. The movement of the angle of inclination is monitored by means of the respective position sensor 116.

In this case, all the actuating cylinders of the drive device 106 are controlled synchronously to permit a uniform angle adjustment. If too great a pulse deviation (with respect to number) is detected between actuating cylinders associated with the same conveyor belt section, the further adjustment is stopped and a return to the reference position 114 occurs and/or an error is indicated at the terminal 48. An error points to a defective actuating cylinder, for example.

The angle of inclination 104 is dependent on the product size. For smaller products the angle of inclination 104 is adjusted to be greater relative to the horizontal plane 98, for larger products it is adjusted to be smaller.

After adjustment of the defined angle position of the first conveyor belt section 66 and the second conveyor belt section 68 (respectively for the corresponding region) the labelling head 26 is moved into the corresponding "processing position", if necessary. The characterisation system is then ready for operation.

During operation, the corresponding objects 110 are delivered. They are fed into the characterisation system via the feed region 50. A separation process occurs in the separation region 54 to allow objects that are spaced from one another to be fed to the labelling device 20. A weighing process is conducted on individual objects in the weighing region 58 to determine the weight of an individual object 110.

In this case, the conveyor belt unit 60 of the weighing region 58 is positioned on a weighing cell. The weighing cell is indicated with the reference 120 in FIG. 3. In particular, the cross beam 88, to which the respective actuating cylinders for the weighing region 58 are articulated, is also positioned on the weighing cell 120.

The determined weight data are transferred to the control device 46. This actuates the labelling device 20, at which a corresponding label is printed. The label contains, for example, the weight data of the object just weighed and the corresponding price.

The labelling of the object occurs in the labelling region 62, i.e. the label is applied to it. In particular, self-adhesive labels are applied.

Because the adjustment of the angle of inclination 104 is adapted to the respective category of the objects 110, it is assured that the objects 110 are fed to the weighing device 18 and the labelling device 20 "centred" in a defined position, so that a reliable and quick weighing and label application are possible. High labelling rates can be achieved as a result.

The characterisation system 100 is simple to operate because of the automatic adjustability of the angle of inclination 104 adapted to the respective object category.

The invention claimed is:

1. A characterisation system for objects, comprising:
   at least one characterisation device for the objects;
   a conveyor belt assembly for feeding objects to the at least one characterisation device, said conveyor belt assembly comprising at least one region with a first conveyor belt section and with a second conveyor belt section;
   wherein the first conveyor belt section and the second conveyor belt section lie parallel and adjacent to one another and are positionable at an angle of inclination to a horizontal plane to provide a trough-shaped conveyor path with the first conveyor belt section and the second conveyor belt section in a V arrangement; and
   a drive device for the first conveyor belt section and the second conveyor belt section for the adjustment of defined angle positions.

2. The characterisation system according to claim 1, wherein a control device is provided, by means of which the drive device is controllable as a function of product data of the objects for the defined adjustment of the angle positions.

3. The characterisation system according to claim 2, wherein the product data, on the basis of which the angle positions are adjusted, are geometric data.

4. The characterisation system according to claim 2, wherein a sensor device for determination of the product data is provided, on the basis of which the angle positions are adjusted.

5. The characterisation system according to claim 1, wherein a product data base for product data is provided, on the basis of which the angle positions are adjusted.

6. The characterisation system according to claim 1, wherein the drive device is configured and controlled such that defined angle positions are automatically adjustable.

7. The characterisation system according to claim 1, wherein the drive device has at least one actuating cylinder for each conveyor belt section.

8. The characterisation system according to claim 7, wherein the at least one actuating cylinder is operated electromotively.

9. The characterisation system according to claim 7, wherein the at least one actuating cylinder is operated pneumatically or hydraulically.

10. The characterisation system according to claim 7, wherein the at least one actuating cylinder is articulated to the corresponding conveyor belt section and to a frame.

11. The characterisation system according to claim 1, wherein an adjustment of a defined angle position of a conveyor belt section is performed starting from a reference position.

12. The characterisation system according to claim 11, wherein the reference position is a horizontal position.

13. The characterisation system according to claim 2, wherein the control device actuates the drive device for adjustment of an angle position by incrementing pulses starting from a reference position.

14. The characterisation system according to claim 13, wherein a synchronous control of different drive sub-units of the drive device is provided.

15. The characterisation system according to claim 1, wherein the first conveyor belt section and the second conveyor belt section are supported at least one of against one another and on a frame.

16. The characterisation system according to claim 1, wherein the drive device is configured such that angle positions are adjustable in continuous manlier.

17. The characterisation system according to claim 1, wherein the drive device is configured such that discrete angle positions are adjustable.

18. The characterisation system according to claim 1, wherein a conveyor belt of the first conveyor belt section is driven by a drive, which is positioned on the first conveyor belt section.

19. The characterisation system according to claim 1, wherein a conveyor belt of the second conveyor belt section is driven by a drive, which is positioned on the second conveyor belt section.

20. The characterisation system according to claim 1, wherein a weighing device is provided as the at least one characterisation device.

21. The characterisation system according to claim 1, wherein a labelling device is provided as the at least one characterisation device.

22. The characterisation system according to claim 21, wherein the labelling device is movable relative to the conveyor belt assembly.

23. The characterisation system according to claim 22, wherein the labelling device has a labelling head, which is displaceable in at least one direction transversely to a transport direction of the conveyor belt assembly.

24. The characterisation system according to claim 22, wherein the labelling device has a labelling head, which is pivotable around at least one pivot axis.

25. The characterisation system according to claim 24, wherein the at least one pivot axis is oriented transversely to a transport direction of the conveyor belt assembly.

26. The characterisation system according to claim 24, wherein the at least one pivot axis is a vertical axis.

27. The characterisation system according to claim 1, wherein the conveyor belt assembly has a plurality of regions, which each have a first conveyor belt section and a second conveyor belt section.

28. The characterisation system according to claim 27, wherein the conveyor belt assembly has a feed region.

29. The characterisation system according to claim 27, wherein the conveyor belt assembly has a separation region.

30. The characterisation system according to claim 27, wherein the conveyor belt assembly has a weighing region.

31. The characterisation system according to claim 27, wherein the conveyor belt assembly has a labelling region.

32. The characterisation system according to claim 27, wherein the angle positions of the first conveyor belt sections and the second conveyor belt sections are synchronisable in the different regions by a control device.

33. The characterisation system according to claim 1, wherein at least one safety wall is provided on the conveyor belt assembly.

34. The characterisation system according to claim 1, wherein at least one position sensor is respectively associated with the first conveyor belt section and the second conveyor belt section.

35. A method for feeding objects to a characterisation device by means of a conveyor belt assembly, comprising:
adjusting an angle of a first conveyor belt section and a second conveyor belt section of the conveyor belt assembly relative to a horizontal plane automatically by means of a drive device as a function of product data of the objects.

36. The method according to claim 35, wherein the product data are geometric data.

37. The method according to claim 35, wherein the angle relative to the horizontal plane is adjusted to be larger if the objects have smaller geometric dimensions.

38. The method according to claim 35, wherein the product data are at least one of taken from a product data base and are determined by a sensor assembly.

39. The method according to claim 35, wherein the adjustment of a defined angle position is performed starting from a reference position.

40. The method according to claim 39, wherein the reference position is a horizontal position.

* * * * *